(12) United States Patent
Hu (10) Patent No.: US 11,514,891 B2
(45) Date of Patent: Nov. 29, 2022

(54) NAMED ENTITY RECOGNITION METHOD, NAMED ENTITY RECOGNITION EQUIPMENT AND MEDIUM

(71) Applicant: Beijing BOE Technology Development Co., Ltd., Beijing (CN)

(72) Inventor: Fengshuo Hu, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 225 days.

(21) Appl. No.: 16/652,233

(22) PCT Filed: Aug. 28, 2019

(86) PCT No.: PCT/CN2019/103027
§ 371 (c)(1),
(2) Date: Mar. 30, 2020

(87) PCT Pub. No.: WO2020/043123
PCT Pub. Date: Mar. 5, 2020

(65) Prior Publication Data
US 2020/0251097 A1 Aug. 6, 2020

(30) Foreign Application Priority Data
Aug. 30, 2018 (CN) .......................... 201811005796.4

(51) Int. Cl.
*G10L 15/00* (2013.01)
*G10L 15/16* (2006.01)
(Continued)

(52) U.S. Cl.
CPC ............ *G10L 15/16* (2013.01); *G06F 40/295* (2020.01); *G10L 15/26* (2013.01); *G10L 2015/088* (2013.01)

(58) Field of Classification Search
CPC .... G06F 40/237; G06F 40/279; G06F 40/284; G06F 40/289; G06F 40/295; G10L 15/02;
(Continued)

(56) References Cited

U.S. PATENT DOCUMENTS 5,598,505 A * 1/1997 Austin .................... G10L 15/20
704/226
2011/0310237 A1 12/2011 Wang et al.
(Continued)

FOREIGN PATENT DOCUMENTS

| CN | 1042008004 A | 12/2014 |
| CN | 108305642 A | 7/2018 |
| CN | 108320734 A | 7/2018 |

OTHER PUBLICATIONS

Almaliki, Zaid A., "Standardization VS Normalization", Jul. 27, 2018, Medium (Year: 2018).*

*Primary Examiner* — Edgar X Guerra-Erazo
*Assistant Examiner* — Alexander Joongie Kim
(74) *Attorney, Agent, or Firm* — Dilworth & Barrese, LLP.; Michael J. Musella, Esq.

(57) ABSTRACT

A named entity recognition method, a named entity recognition equipment and a medium are disclosed, the method including: acquiring a voice signal; extracting a voice feature vector in the voice signal; extracting, based on a literalness result after voice recognition is performed on the voice signal, a literalness feature vector in the literalness result; splicing the voice feature vector and the literalness feature vector to obtain a composite feature vector of each word in the voice signal; processing the composite feature vector of each word in the voice signal through a deep learning model to obtain a named entity recognition result.

17 Claims, 6 Drawing Sheets

(51) Int. Cl.
*G06F 40/295* (2020.01)
*G10L 15/26* (2006.01)
*G10L 15/08* (2006.01)

(58) Field of Classification Search
CPC ......... G10L 15/04; G10L 15/05; G10L 15/08; G10L 15/16; G10L 15/26; G10L 25/03; G10L 25/06–21; G10L 25/51; G10L 25/63; G10L 2015/088
See application file for complete search history.

(56) References Cited

U.S. PATENT DOCUMENTS

| | | | |
|---|---|---|---|
| 2018/0068661 A1* | 3/2018 | Printz | G06F 40/295 |
| 2019/0294676 A1* | 9/2019 | Sapugay | G06N 5/022 |
| 2019/0295537 A1* | 9/2019 | Sapugay | G06N 20/00 |
| 2020/0042770 A1* | 2/2020 | Yan | G06T 7/11 |
| 2021/0256961 A1* | 8/2021 | Garman | G10L 13/10 |

\* cited by examiner

NAMED ENTITY RECOGNITION METHOD, NAMED ENTITY RECOGNITION EQUIPMENT AND MEDIUM

CROSS-REFERENCE TO RELATED APPLICATIONS

The present disclosure claims priority to Chinese patent application with the application No. of 201811005796.4, filed on Aug. 30, 2018 in China, which is incorporated by reference herein in its entirety as part of the present disclosure.

TECHNICAL FIELD

The present disclosure relates to the field of artificial intelligence, and more particularly, to a named entity recognition method, a named entity recognition device, a named entity recognition equipment and a medium.

BACKGROUND

With the development of artificial intelligence and big data technology, technical requirements for voice recognition and natural language processing continue to rise, wherein named entity recognition, as a necessary pre-operation for semantic understanding, voice synthesis and other tasks, has an important role in natural language understanding.

At present, the commonly used entity recognition methods are mostly directed to voice recognition in a wide range of application scenarios, however, the existing named entity recognition methods are difficult to recognize well in special scenarios, such as artworks, books, foreign names etc. of complex special names.

Therefore, there is a need for a named entity recognition method that has good recognition precision and accuracy in special scenarios.

SUMMARY

According to an aspect of the present disclosure, there is provided a named entity recognition method, including: acquiring a voice signal; extracting a voice feature vector in the voice signal; extracting, based on a literalness result after voice recognition is performed on the voice signal, a literalness feature vector in the literalness result; splicing the voice feature vector and the literalness feature vector to obtain a composite feature vector of each word in the voice signal; processing the composite feature vector of each word in the voice signal through a deep learning model to obtain a named entity recognition result.

In some embodiments, wherein extracting the voice feature vector in the voice signal includes: extracting a voice sentence feature vector and extracting a voice word feature vector.

In some embodiments, wherein extracting the voice sentence feature vector in the voice signal includes: converting, according to a voice parameter comparison table in a preset voice sentence database, a voice sentence feature in the voice signal into a corresponding voice sentence feature vector.

In some embodiments, wherein extracting a voice word feature vector in the voice signal includes: obtaining a voice word feature vector in the voice signal by performing voice analysis on the voice signal.

In some embodiments, wherein performing voice analysis on the voice signal includes: performing discrete sampling on the voice signal in a time domain and a frequency domain to obtain a digital voice signal; processing each word in the digital voice signal in the time domain and the frequency domain respectively to obtain a time domain feature vector and a frequency domain feature vector thereof; splicing, for each word in the voice signal, the time domain feature vector and the frequency domain feature vector thereof to obtain a voice word feature vector corresponding to each word.

In some embodiments, wherein extracting, based on the literalness result after the voice recognition is performed on the voice signal, the literalness feature vector in the literalness result includes: extracting a word feature vector and extracting a word segmentation embedding feature vector.

In some embodiments, wherein extracting the word feature vector in the literalness result includes: converting, according to a literalness-vector value comparison table in a preset word database, the literalness into a corresponding word feature vector.

In some embodiments, wherein extracting the word segmentation embedding feature vector in the literalness result includes: dividing, according to a phrase comparison table in a preset phrase database, a phrase and an individual word in the literalness result; converting, according to a preset transform rule, each word in the phase and the individual word into a corresponding word segmentation embedding feature vector respectively.

In some embodiments, wherein splicing the voice feature vector and the literalness feature vector to obtain the composite feature vector of each word in the voice signal includes: performing normalization processing on the extracted voice feature vector and the extracted literalness feature vector respectively; subjecting a dense literalness feature vector and a dense voice feature vector obtained for each word in the voice signal after the normalization processing to vector-splicing so as to obtain the composite feature vector for each word in the voice signal.

In some embodiments, wherein splicing the voice feature vector and the literalness feature vector to obtain the composite feature vector of each word in the voice signal includes: vector-splicing a dense literalness feature vector and a dense voice feature vector obtained for each word in the voice signal to obtain the composite feature vector for each word in the voice signal; performing normalization processing on the voice feature vector and the literalness feature vector in the obtained composite feature vector respectively.

In some embodiments, wherein performing normalization processing includes: performing linear function normalization processing on the voice feature vector and the literalness feature vector respectively.

In some embodiments, wherein performing normalization processing includes: performing zero-mean standardization processing on the voice feature vector and the literalness feature vector respectively.

In some embodiments, wherein processing the composite feature vector of each word in the voice signal through the deep learning model to obtain the named entity recognition result includes: sending the composite feature vector to an input terminal of a selected deep learning model; processing the composite feature vector through respective layers in the selected deep learning model; obtaining a named entity recognition result at an output terminal of the deep learning model.

In some embodiments, wherein in a case where the voice signal contains multiple sentences, before processing the composite feature vector of each word in the voice signal through a deep learning model to obtain the named entity recognition result, the method further includes: truncating, according to a sentence length feature value corresponding to a current sentence in the voice signal, all obtained composite feature vectors of the voice signal to obtain multiple composite feature vector sequences, wherein the number of the composite feature vector sequences is equal to the number of sentences contained in the voice signal, and the number of the composite feature vectors possessed by each of the multiple composite feature vector sequences is equal to the sentence length feature value corresponding to the current sentence in the voice signal.

In some embodiments, wherein the sentence length feature value of the current sentence in the voice signal is obtained from a voice feature vector in the voice signal.

In some embodiments, wherein the sentence length feature value of the current sentence in the voice signal is obtained from the literalness result after voice recognition is performed on the voice signal.

According to another aspect of the present disclosure, there is provided a named entity recognition device, including: a voice signal collector configured to acquire a voice signal; a voice feature vector extractor configured to extract a voice feature vector in the voice signal; a literalness feature vector extractor configured to extract, based on a literalness result after voice recognition is performed on the voice signal, a literalness feature vector in the literalness result; a composite vector generator configured to splice the voice feature vector and the literalness feature vector to obtain a composite feature vector of each word in the voice signal; a named entity recognizer configured to process the composite feature vector of each word in the voice signal through a deep learning model to obtain a named entity recognition result.

According to another aspect of the present disclosure, there is provided a named entity recognition equipment, wherein the equipment includes a voice acquisition device, a processor and a memory, the memory contains a set of instructions that, when executed by the processor, cause the named entity recognition equipment to execute the method described above.

According to another aspect of the present disclosure, there is provided computer-readable storage medium, characterized in having computer-readable instructions stored thereon, wherein the method described above is executed when the instructions are executed by a computer.

BRIEF DESCRIPTION OF THE DRAWINGS

In order to more clearly illustrate the technical solutions of the embodiments of the present disclosure, hereinafter, the drawings necessary for illustration of the embodiments of the present disclosure will be introduced briefly, the drawings described below are obviously only some embodiments of the present disclosure, it is possible for a person of ordinary skill in the art to obtain other drawings based on these drawings without paying creative efforts. The following drawings are focused on showing the gist of the present disclosure, not schematically scaled by actual dimensions.

DETAILED DESCRIPTION OF THE EMBODIMENTS

Hereinafter, the technical solutions in the embodiments of the present disclosure will be described in a clear and complete way with reference to the accompanying drawings. Obviously, these described embodiments are merely parts of the embodiments of the present disclosure, rather than all of the embodiments thereof. Other embodiments obtained by a person of ordinary skill in the art based on the embodiments of the present disclosure without paying creative effort all fall into the protection scope of the present disclosure.

As illustrated in the present disclosure and the claims, the words "a", "an" and/or "the" do not specifically refer to the singular form, but may include the plural form, unless the context clearly indicates otherwise. Generally, the terms "include" and "comprise" are intended to include only the steps and elements that are specified, but these steps and elements do not constitute an exclusive list, and the method or device may also include other steps or elements.

Although the present disclosure makes various references to certain modules in the system in accordance with the embodiments of the present disclosure, any number of different modules can be used and executed on a user terminal and/or a server. The modules are merely illustrative, and different aspects of the systems and methods may use different modules.

Flowcharts are used in the present disclosure to illustrate operations executed by the system in accordance with the embodiments of the present disclosure. It should be understood that the preceding or subsequent steps are not necessarily performed in the precise order. Instead, the respective steps may be processed in the reverse order or simultaneously as needed. Also, other operations may be added to these procedures, or one or more steps may be removed from these procedures.

In view of the above problems, the present disclosure provides a named entity recognition method, a named entity recognition device, a named entity recognition equipment, and a medium. The voice information that is not included in the literalness, such as accent, pause, and intonation, are normalized and merged with the literalness feature, introduced into a deep learning model, so as to jointly guide the named entity recognition process. The complex special name's effect on sentence structure determination and entity recognition in special scenarios is solved, precision and accuracy of entity recognition are improved, and the application scope of entity recognition is further enlarged.

Figure 1:
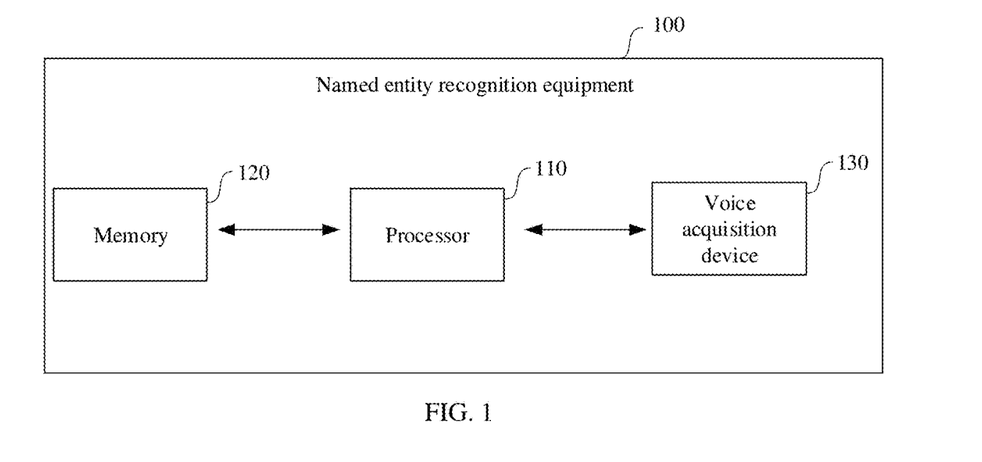
FIG. 1 illustrates an exemplary block diagram of a named entity recognition equipment according to embodiments of the present disclosure.

FIG. 1 illustrates an exemplary block diagram of a named entity recognition equipment according to embodiments of the present disclosure. The named entity recognition equipment 100 shown in FIG. 1 may be implemented to include a voice acquisition device 130 and one or more dedicated or general-purpose computer processing system modules or components. The voice acquisition device, such as a microphone component, may include a microphone, a microphone sleeve, a mounting rod, a connecting line, etc.; it may also be a wireless microphone or a microphone circuit. The one or more dedicated or general-purpose computer processing system modules or components, such as personal computers, laptops, tablets, mobile phones, personal digital assistance (PDA), smart glasses, smart watches, smart rings, smart helmets and any smart portable devices, may include at least one processor 110 and a memory 120.

The at least one processor is configured to execute a program instruction. The memory 120 may exist in the named entity identification equipment 100 in different forms of program storage unit and data storage unit, such as a hard disk, a read-only memory (ROM), and a random access memory (RAM), it can be used to store various data files used in the process that the processor processes and/or executes named entity recognition, and possible program instructions executed by the processor. Although not shown in the figure, the named entity recognition equipment 100 may further include an input/output component to support input/output data flow between the named entity recognition equipment 100 and other components (such as a screen display device). The named entity recognition equipment 100 may also send data and information to and receive data and information from a network through a communication port.

In some embodiments, the named entity recognition equipment 100 may acquire a voice signal generated from a specific ambient environment, and perform a named entity recognition method described below on the received voice signal to achieve the function of the named entity recognition device described above. The voice signal in the specific scenario may be a human voice signal, specifically, it may be, for example, commentary in a museum or an art exhibition, review content on paintings and calligraphy appreciation, lecture content for a character or a history course, and the like.

Although the processor 110, the memory 120, and the voice acquisition device 130 are presented as separate modules in FIG. 1, a person skilled in the art can understand that the above device modules may be implemented as separate hardware devices or integrated into one or more hardware devices, such as integrated in smart watches or other smart devices. As long as the principles described in the present disclosure can be implemented, the specific implementation of different hardware devices should not be taken as a factor limiting the protection scope of the present disclosure.

Based on a specific scenario, the voice signal acquired by the voice acquisition device 130 may include a large number of complex special names, for example, the voice acquired in a specific scenario of painting and calligraphy appreciation may include "The Very Quiet Dawn over Here", "Walking in the Rain", "What I talk about when I talk about running" and other complicated titles of paintings and books.

Figure 2:
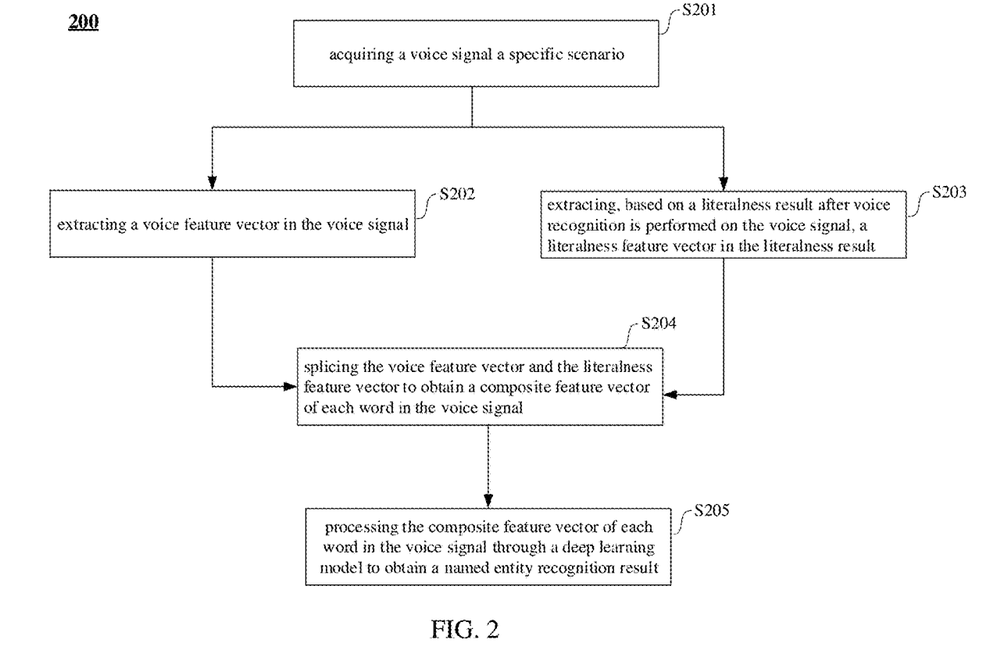
FIG. 2 illustrates an exemplary flowchart of a named entity recognition method according to embodiments of the present disclosure.

Therefore, in order to well determine a sentence structure and identify a named entity in the case where a variety of complex special names appear in a specific scenario, the present disclosure provides a named entity recognition method. FIG. 2 illustrates an exemplary flowchart of a named entity recognition method according to embodiments of the present disclosure.

As shown in FIG. 2, according to the named entity recognition method 200, first, a voice signal in a specific scenario is acquired in step S201. As mentioned earlier, the voice signal in the specific scenario may be acquired by a separate voice acquisition device, or may be acquired by a voice acquisition module integrated with a computer processing system. The embodiments of the present disclosure are not limited by the source and acquisition method of the voice signal. For example, it may be acquired by a separate microphone, or it may also be acquired by a microphone circuit integrated with a computer processing system.

A voice feature vector in the voice signal is extracted based on the acquired voice signal in step S202. Extracting a voice feature vector in the voice signal can be implemented, for example, by performing time domain and frequency domain feature extraction on the voice signal, or by filtering and adding window analysis to the voice signal.

Based on the acquired voice signal, a literalness feature vector in the literalness result is extracted further based on a literalness result after voice recognition is performed on the voice signal in step S203. The voice recognition may be implemented by, for example, a deep learning algorithm or other voice signal recognition methods, the embodiments of the present disclosure are not limited by the voice recognition method and process. Extracting, based on a literalness result after voice recognition, a literalness feature vector in the literalness result can be implemented by comparing with a word database or a phrase database to recognize the named entity, or by determining the sentence structure.

It should be understood that the operations of steps S202 and S203 may be performed in parallel, or performed sequentially, no limitation is made here. Further, as required, steps S202 and S203 may be performed based on different voice signals obtained after pre-processing, as long as these voice signals are derived from the same original voice signal.

After extraction of the voice feature vector and the literalness feature vector is completed, the voice feature vector and the literalness feature vector are spliced to obtain a composite feature vector of each word in the voice signal in step S204. In the splicing process, for example, the feature vectors of the two can be connected to form a composite feature vector, or the voice feature vector and the literalness feature vector can be normalized to obtain a normalized vector.

Based on the obtained composite feature vector, the composite feature vector of each word in the voice signal is processed through a deep learning model to obtain a named entity recognition result in step S205. The deep learning model may be adopting a model based on statistical methods, such as HiddenMarkovModel (HMM), MaxmiumEntropy (ME), Support VectorMachine (SVM), or it may be adopting a model based on the sample relationship in time series, such as a long short-term memory network (LSTM), a recurrent neural network (RNN).

In some embodiments, extracting a voice feature vector in a voice signal may further include: extracting a voice sentence feature vector and extracting a voice word feature vector. Extracting a voice sentence vector can be more specifically described, for example, extracting prosodic features such as fundamental frequency, speech rate, formant in the voice signal, or extracting features related to spectrum of the voice signal, such as Mel frequency cepstrum coefficient (MFCC). Extracting a voice word vector can, for example, segment the voice signal by words, extract a pronunciation duration corresponding to each word, a start time point of a host word, an end time point of a host word, or can extract a maximum frequency of pronunciation of each word, a maximum sound intensity, a sound intensity integral average etc. in the voice signal. Further description will be provided below with reference to FIGS. 3A and 3B.

Figure 3A:
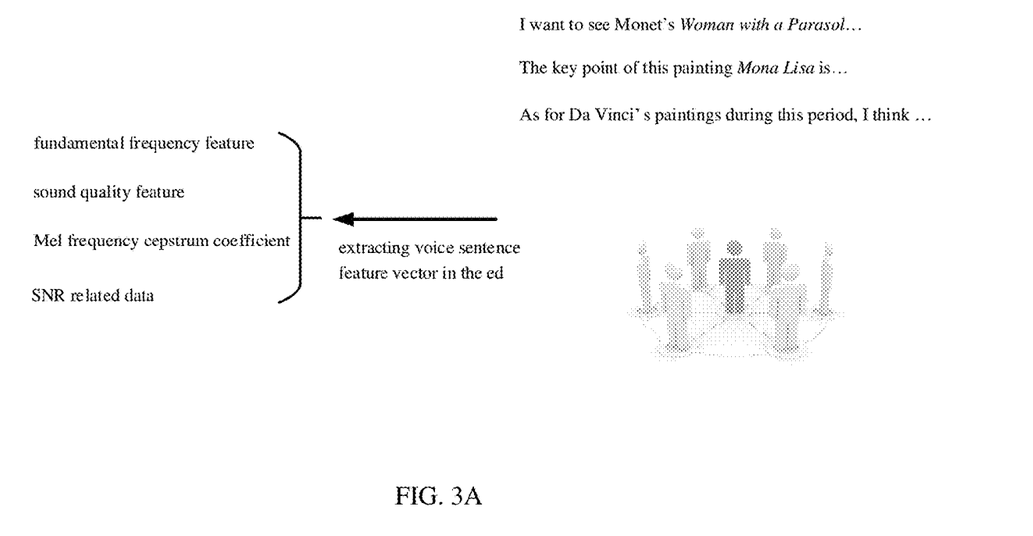
FIG. 3A illustrates a schematic diagram of extracting a voice sentence feature vector in a voice signal in a special scenario according to embodiments of the present disclosure.

FIG. 3A illustrates a schematic diagram of extracting a voice sentence feature vector in a voice signal in a special scenario according to embodiments of the present disclosure. For example, the special scenario is an art exhibition, wherein the voice signal is commentary in the exhibition. In this special scenario, the voice sentence feature vector in the extracted voice signal can be further set to: extracting a low-level feature vector at a frame level thereof. More specifically, for example, based on each sentence in the voice signal of commentary of the current art exhibition, a fundamental frequency feature, a sound quality feature, and a Mel frequency cepstrum coefficient (MFCC) are extracted, thereby the sentence feature vector based on each sentence is obtained.

The fundamental frequency feature can reflect an overall performance of the voice, for example, in general, the fundamental frequency feature of women is higher than that of men, so it can be used to distinguish between genders, and after further processing, mixed acoustic noise of other genders is removed, a more accurate sentence length feature value is obtained, through which feature it can assist in correcting the sentence length in the literalness result of voice recognition to avoid recognition errors caused by the inclusion of ambient sounds or other human voices in the acquired voice. The Mel frequency cepstrum coefficient can be further used to identify sound attributes and distinguish different human voices existing in the voice.

Based on the feature vector content extracted in the embodiments of the present disclosure, when extracting the voice sentence feature vector in the voice signal, according to the embodiments of the present disclosure, for example, when extracting the Mel frequency cepstrum coefficient feature vector, a preliminary signal processing result may be first obtained based on a process such as pre-processing, enframing, adding window, etc., then a Fourier transform is adopted over the preliminary processing result, and further filtering and discrete cosine transform (DCT) is performed on the transformed signal, a dynamic feature vector (Delta MFCC) corresponding to the sentence is obtained finally, that is, the sentence feature vector. For vectors such as the fundamental frequency feature and the sound quality feature, different statistical functions can be adopted to convert a basic acoustic feature of a varying sentence duration into a fixed-length static feature. These statistical functions may include maximum and minimum values, mean, duration, variance, and so on.

In some embodiments, the voice sentence feature vector in a voice signal is extracted, it can be converted into a voice sentence feature vector corresponding to its property by comparing the extracted voice property with a voice parameter comparison table in a preset voice sentence database. It can be specifically described as, for example, in the preset voice comparison table, if the frequency range of male voice is set to 100 to 480 Hz and the frequency range of female voice is set to 160 to 1000 Hz, the fundamental frequency feature in the extracted sentence can be classified and identified. For example, if the average frequency value of the current sentence acquired is 780 Hz, it can be determined as female voice, and the feature vector value can be obtained based on a preset rule of the table, for example, the corresponding voice sentence feature vector value is assigned a value of 1.

Figure 3B:
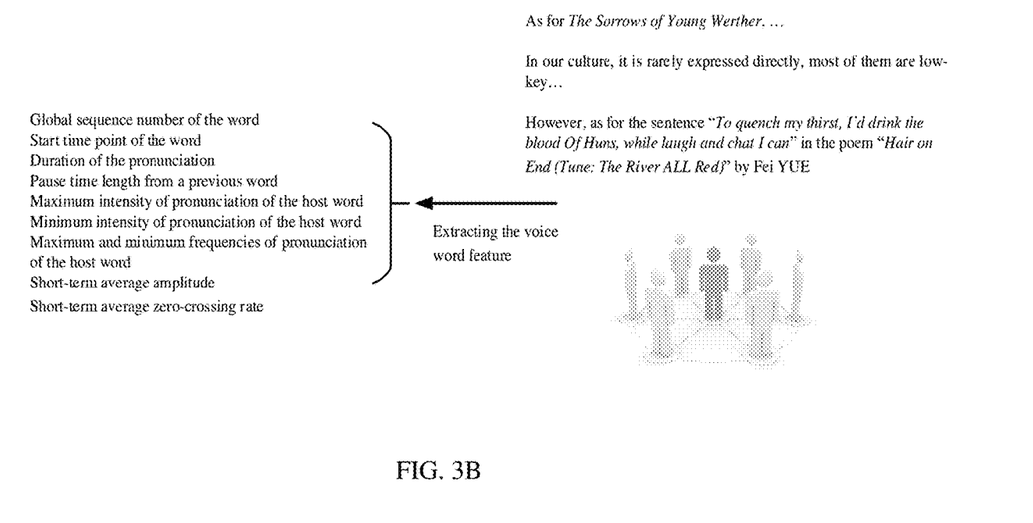
FIG. 3B illustrates a schematic diagram of extracting a voice word feature vector in a voice signal in a special scenario according to embodiments of the present disclosure.

FIG. 3B illustrates a schematic diagram of extracting a voice word feature vector in a voice signal in a special scenario according to embodiments of the present disclosure. For example, the special scenario is literary appreciation, wherein the voice signal is review content on literature. In this special scenario, the voice word feature vector in the extracted voice signal can be further set to include its time domain feature vector and frequency domain feature vector. More specifically, the voice word feature vector may include a global sequence number of the word, a start time point of the word, a duration of the pronunciation, a pause time length from a previous word, a maximum intensity of pronunciation of the host word, a minimum intensity of pronunciation of the host word, maximum and minimum frequencies of pronunciation of the host word, a short-term average amplitude, and a short-term average zero-crossing rate.

The average zero-crossing rate can distinguish whether the current word is voiced or devoiced. In particular, even when the voiced and unvoiced voices overlap in the voice signal, it still has a good distinguish effect, which makes it useful for correcting the unvoiced voiced sound-linking or ambiguity caused by the fast speaking speed in the literalness result of voice recognition, such as the recognition error caused by the sound-linking of "特 (ther)" and "的 (of)" (in Chinese pronunciations of "特" and "的" are successive) in "少年维特的烦恼" (The Sorrows of Young Werther)" during fast sound-linking. The short-term average energy can be used as a basis for determining initials and finals, and voiced and unvoiced. Based on it, positions of sentence segmentation and continuity of words in the literalness result of voice recognition can be checked and corrected, and the sentence length of the current sentence can be further obtained by segmenting the sentence when it is combined with the pause duration data. The maximum and minimum sound intensity of the host word can be used to characterize an audio feature of the host word, it can be used in the case of noisy background or slow voice speed, in which the head and tail belonging to a word are identified as independent words due to slow speed in the literalness result of voice recognition, for example, the "渴 (thirst)" in "笑谈渴饮匈奴血 (To quench my thirst, I'd drink the blood Of Huns, while laugh and chat I can)" in poem recitation is recognized as "hateful"(in Chinese, "ful (叫)" and "thirst (渴)" have the same pronunciation).

Figure 3C:
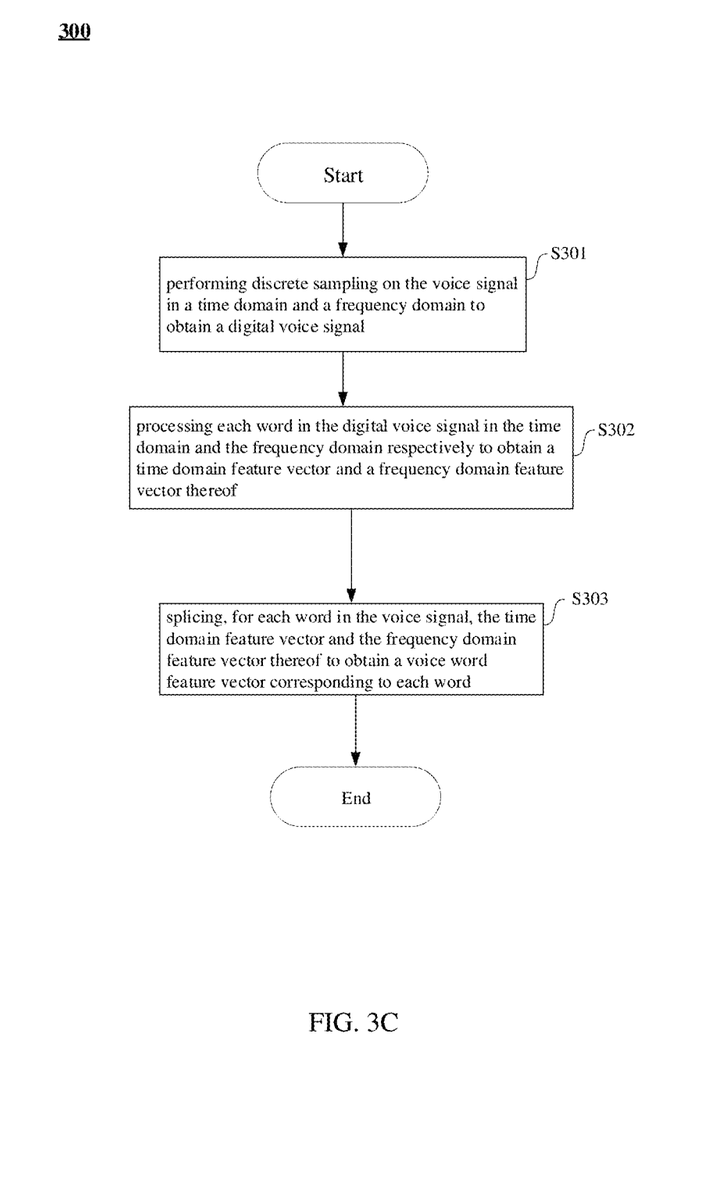
FIG. 3C illustrates an exemplary flowchart of extracting a voice word feature vector in a voice signal according to embodiments of the present disclosure.

Extracting the voice word feature in the voice signal described above can be implemented by performing voice analysis on the voice signal. Referring to FIG. 3C, in voice analysis 300, first, discrete sampling needs to be performed on the voice signal in a time domain and a frequency domain to obtain a digital voice signal through step S301. For example, a unit pulse sequence may be adopted to sample a voice signal at a preset sampling frequency, in particular, its sampling value may be selected according to the Nyquist sampling theorem. The voice signal may be a voice signal directly acquired by a microphone or a voice signal pre-processed or de-noised by a computer.

After the discrete sampling on the voice signal in the time domain and the frequency domain is completed, each word in the digital voice signal is further processed in the time domain and the frequency domain respectively through step S302 to obtain its time domain feature vector and frequency domain feature vector. Specifically, during the time domain processing of the voice signal, for example, the short-term average energy and short-time over-level rate of the voice signal on a linear scale can be obtained through the adding window processing. During the frequency domain processing of the voice signal, for example, the host word maximum pronunciation frequency and cepstrum parameters of each word may be extracted through signal analysis to obtain a frequency domain literalness feature vector including the maximum pronunciation frequency feature and the cepstrum parameter feature.

After obtaining the voice sentence feature vector and the voice word feature vector of each word in the voice signal, for each word in the voice signal, the time domain feature vector and the frequency domain feature vector are spliced to obtain a voice word feature vector corresponding to each word in step S303. The splicing can be implemented, for example, by directly connecting the time domain feature vector and the frequency domain feature vector, or classifying them based on subsequent discrimination requirements, and grouping the time domain and frequency domain vectors belonging to the same category for splicing.

The above steps can be described in more detail, for example, the obtained time domain feature vector T is $(t_1, t_2, t_3)$, the obtained frequency domain feature vector F is $(f_1, f_2, f_3)$, then a literalness feature vector $M_V$ corresponding to the current word can be obtained after splicing, and its feature vector $M_V$ is $(t_1, t_2, t_3, f_1, f_2, f_3)$.

Figure 4:
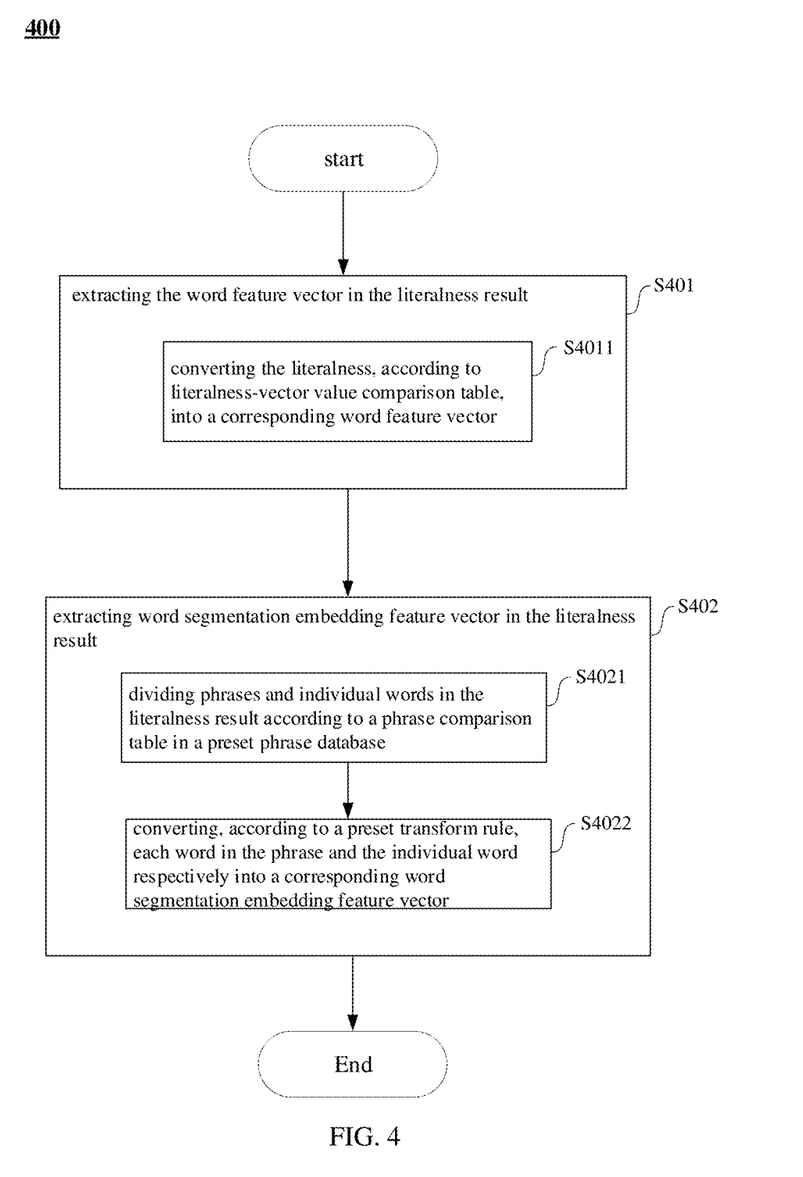
FIG. 4 shows an exemplary flowchart of extracting a literalness feature vector in a voice signal according to embodiments of the present disclosure.

FIG. 4 shows an exemplary flowchart of extracting a literalness feature vector in a voice signal according to embodiments of the present disclosure.

As shown in FIG. 4, the method 400 for extracting a literalness feature vector in the voice signal includes: extracting a word feature vector and extracting a word segmentation embedding feature vector of the literalness. The word feature vector of the literalness characterizes each word recognized after voice recognition, for example, different values are used to represent different words after conversion. The word segmentation embedding vector characterizes phrases appearing in the current sentence and their constituent structure relationship, for example, it can represent the phrase and word by different values, and it can also indicate the first, middle, and end words in a phrase by the positive and negative values.

Based on the above, further, the word feature vector in the literalness result is extracted in step S401, the literalness is converted, according to literalness-vector value comparison table, into a corresponding word feature vector through step S4011. The preset word database can be an existing corpus material dataset, such as the 100-dimensional Chinese word vectors disclosed by Wikipedia, or a self-designed corpus material dataset for high-frequency vocabulary in a specific scenario, such as related word vectors for Renaissance painting art.

The above steps can be described in more detail, for example, for the sentence "I want to see Monet's Woman with a Parasol (我想看莫奈的撑 阳伞的女人)" in the literalness result obtained by voice recognition, with reference to the 100-dimensional Chinese word vectors disclosed by Wikipedia, discrete vector $D_V$ corresponding to this sentence can be obtained, the discrete vector $D_V$ is (28, 36, 108, 196, 300, 3, 314, 180, 204, 3, 91, 29), and each value in the vector corresponds to a word feature value of each word in the sentence.

After the word feature vector corresponding to the literalness is obtained, the word segmentation embedding feature vector in the literalness result is further extracted through step S402. As shown in FIG. 4, first, phrases and individual words in the literalness result are divided according to a phrase comparison table in a preset phrase database through step S4021. The preset phrase database can be an existing phrase corpus material database, or a self-designed phrase corpus material dataset for high-frequency vocabulary in a specific scenario. Phrases and words can be divided by different numerical values or positive or negative. After division of the phrases and the single words in the literalness result is completed, each word in the phrase and the individual word are respectively converted into a corresponding word segmentation embedding feature vector according to a preset transform rule through step S4022. The transform rule may be based on a start word, a middle word, and an end word in the phrase, each may be assigned a preset value, or may be based on the number of words in the phrase, a sequence number is provided for each word in the phrase based on its position in the phrase.

The above steps can be described in more detail, for example, as for "What do you think of Haruki Murakami's What I talk about when I talk about running? (你怎么看村上春树的当该在谈跑 步时我在谈什么)" in the literalness result obtained after voice recognition, if the transform rule adopted is: the value corresponding to a single word is 0, the value corresponding to the start word in the phrase is 1, the value corresponding to the middle word (those except the start word and the end word can be regarded as the middle word) is 2, and the value corresponding to the end word is 3, then after the above literalness result is divided and transformed based on the aforesaid transform rule, a word segmentation embedding feature vector $P_V$ can be obtained, wherein the segmentation embedding feature vector $P_V$ is (0,1,1,0,1,2,2,3,0,1,2,2,2,2,2,2,2,2,2,3), as for the sentence "I want to see Monet's Woman with a Parasol (我想看莫奈的 撑阳伞的女人)", its corresponding word segmentation embedding feature vector $P_V$ is (0,0,0,1,3,0,1,2,2,2,3).

It should be understood that the operations of steps S401 and S402 may be performed in parallel, or performed sequentially, no limitation is made here. Further, steps S401 and S402 may be performed as required based on different voice signals obtained after pre-processing, as long as these voice signals are derived from the same original voice signal.

As described above, after the voice feature vector and the literalness feature vector of the voice signal are obtained, the voice feature vector and the literalness feature vector are further spliced to obtain a composite feature vector of each word in the voice signal. As for splicing the voice feature vector and the literalness feature vector, for example, a new vector can be formed by directly connecting them, or internal vector components thereof can be group-spliced according to performance or role.

In some embodiments, the step of splicing the voice feature vector and the literalness feature vector to obtain a composite feature vector of each word in the voice signal includes: performing normalization processing on the extracted voice feature vector and the extracted literalness feature vector respectively; subjecting a dense literalness feature vector and a dense voice feature vector obtained for each word in the voice signal after the normalization processing to vector-splicing so as to obtain a composite feature vector for each word in the voice signal.

Figure 5:
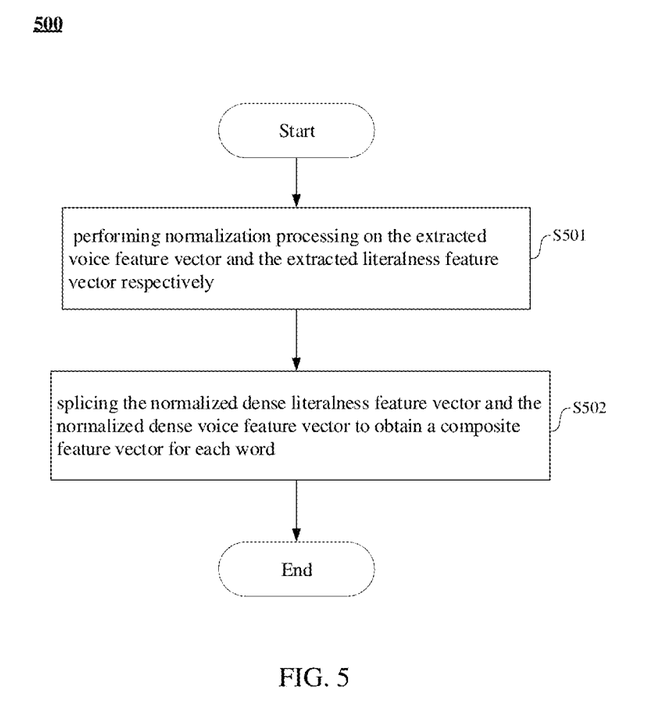
FIG. 5 illustrates an exemplary flowchart of splicing a voice feature vector and a literalness feature vector according to embodiments of the present disclosure.

FIG. 5 illustrates an exemplary flowchart of splicing a voice feature vector and a literalness feature vector according to embodiments of the present disclosure. As an example, steps of the method 500 of splicing the voice feature vector and the literalness feature vector will be further described below with reference to FIG. 5.

As shown in FIG. 5, first, normalization processing is performed on the extracted voice feature vector and the extracted literalness feature vector respectively through step S501. The normalization processing process, in some embodiments, includes performing linear function normalization processing respectively on the voice feature vector and the literalness feature vector. Specifically, it is processed by using the following normalization processing formula:

$$X_{norm}=(X-X_{min})/(X_{max}-X_{min})$$

where $X_{norm}$ is the normalized dense data, X is the original data, and $X_{max}$ and $X_{min}$ represent maximum and minimum values in the original data set.

For example, as for the word segmentation embedding vector of the literalness, if the maximum value of the data in the vector is 3 and the minimum value thereof is 0, then for the word segmentation embedding vector $P_V$=(0,0,0,1,3,0, 1,2,2,2,2,3), after being normalized by adopting the linear function method, the obtained dense word segmentation embedding vector $P_N$ is (0,0,0,0.3,1,0,0.3,0.6,0.6, 0.6,0.6,1).

In some other embodiments, the normalization processing process includes performing zero-mean standardization processing on the voice feature vector and the literalness feature vector respectively. Specifically, it is processed by using the following normalization processing formula:

$$z=(x-\mu)/\sigma$$

where z is the normalized dense data, x is the original data, and μ and σ represent the mean and variance of the original data set.

For example, as for the voice word vector of the text, if the average value μ of the data in the vector is 57 and the variance value σ thereof is 12.5, then for the vector (49,54, 60,62,47,66) in the voice word vector $M_V$, the dense word vector MN obtained after being normalized by the zero-mean standardization processing method is (−0.64, −0.24, 0.24, 0.4, −0.8, 0.72).

After normalization processing of the literalness feature vector and the voice feature vector is completed, the normalized dense literalness feature vector and the normalized dense voice feature vector are spliced to obtain a composite feature vector for each word in the voice signal through step S502. For example, they may be directly spliced, or sub-vectors therein are sequentially spliced in a predetermined order. As an example, the process of splicing the normalized literalness feature vector and the normalized voice feature vector in a predetermined order is described in detail below.

Specifically, if the dense voice word vector $M_{Vi}$ corresponding to the i-th word Wi among the dense vectors obtained after normalization processing is $(t_i,f_i)$, the dense voice sentence vector $S_{Vi}$ corresponding to the word Wi is $(s_{i1}, s_{i2}, \ldots s_{i20})$, the dense word feature vector of literalness $D_{Ni}$ of Wi is $(d_i)$, the dense word segment embedding feature vector $P_{Ni}$ is $(p_{i1},p_{i2}, \ldots p_{i98})$, then in the case of splicing by adopting the order of voice feature vector (voice sentence vector-voice word vector)-literalness feature vector (word vector of literalness-word segment embedding vector), splicing can be implemented, for example, by presetting a length of each feature vector. For example, lengths of the obtained dense word feature vectors of literalness may be compared, a maximum length thereof may be selected as a reference value, accordingly a preset length of the dense word feature vector of literalness may be set to be greater than or equal to the reference value. Based on the preset length, the dense word feature vectors of all literalness in the sentence is expanded to a preset length, this expansion process may be performed, for example, by performing a zero-padding operation thereto. The method described above can set the vector preset length for the aforesaid vectors respectively, and expand them based on the preset length, for example, the preset length of the dense voice word vector is set as 5, wherein it can be further set that the preset length of the time domain voice word vector is 2, the preset length of the frequency domain voice word vector is 3, the preset length of the dense voice sentence vector is 20, the preset length of the dense word feature vector of the literalness is 5, and the preset length of the dense word segmentation embedded feature vector is 100, after expanded with zero padding, the dense voice word vector $M_{Vi}$ of the word Wi is $(t_{i1},0,f_i,0,0)$, the dense voice sentence vector $S_{Vi}$ corresponding to the word Wi is $(s_{i1}, s_{i2}, \ldots s_{i20})$, the dense word feature vector of literalness $D_{Ni}$ of word Wi is $(d_i,0,0,0,0)$, and the dense word segment embedding feature vector $P_{Ni}$ is $(p_{i1},p_{i2}, \ldots p_{i98},0,0)$, then the composite feature vector for the word Wi after splicing in order is the row vector, which is specifically $(s_{i1}, s_{i2}, \ldots s_{i20}, t_{i1},0, f_i,0,0, d_i,0,0,0,0, p_{i1},p_{i2}, \ldots p_{i98},0,0)$.

At the time of splicing, multiple feature vectors belonging to each word can also be classified into different rows to form a feature vector matrix. In the splicing process here, for example, all the current feature vectors can be viewed first to obtain the feature vector with the most vector component members in the current multiple feature vectors, that is, the vector contains the most sub-vector elements. For example, in the current word Wi, the dense word segmentation embedding feature vector $P_{Ni}$ is the one that has the most vector composition members as $(p_{i1},p_{i2}, \ldots p_{i98})$, the number of sub-vectors contained by it is 98. The remaining feature vectors can be expanded based on the maximum number of sub-vectors, to have the same number of sub-vectors as the current word segmentation embedded feature vector $P_{Ni}$, for example, a zero-padding operation can be performed to expand it. The dense voice word vector $M_{Vi}$ of the word Wi, the dense voice sentence vector $S_{Vi}$ corresponding to Wi, and the dense word feature vector $D_{Ni}$ of the literalness corresponding to Wi, which are obtained after zero padding, are all feature vectors containing 98 sub-vectors. Next, they can be combined by adopting also the order of voice feature vector (voice sentence vector voice-voice word vector)-literalness feature vector (word vector of literalness-word segment embedding vector) to form a feature vector matrix of 4 rows, each row has 98 columns, this matrix is the feature matrix that characterizes the word Wi.

It should be understood that the normalization processing and splicing process on the feature vectors is not limited to the order described in the above embodiments. In some other embodiments, the above-mentioned splicing process may be performed first, for example, a preset length is set to obtain the spliced word feature row vectors, or multiple feature vectors belonging to each word are sorted into different rows, to thereby form a feature vector matrix. Thereafter, normalization processing is performed on different components of the above-mentioned spliced feature vector.

Based on the obtained composite feature vector, the composite feature vector of each word in the voice signal is processed through a deep learning model to obtain a named entity recognition result in step S205. Specifically, first, the composite feature vector is sent to an input terminal of a selected deep learning model, wherein the composite vector can be inputted to the deep learning model in sequence, for example, in the form of word or phrase division, or can be truncated with a preset sentence length or a preset paragraph length and thereafter to be inputted into the deep learning model. Next, the composite feature vector is processed through respective layers in the selected deep learning model, wherein the selected deep learning model may be, for example, a Markov model or a conditional random field model. In addition, the deep model may also be a composite deep learning model, such as a composite deep learning model (BiLSTM+CRF) formed by combining a bidirectional long-short-term memory recurrent neural network with a conditional random field algorithm. Specifically, for example, when a composite deep learning model formed by combining a bidirectional LSTM recurrent neural network is selected, the input vector data is calculated by the forward layer and the reverse layer in the bidirectional LSTM recurrent neural network, thereafter it is processed by the conditional random field algorithm layer, finally a processing result of deep learning is obtained. Subsequently, a named entity recognition result can be obtained at an output terminal of the deep learning model.

In some embodiments, in a case where the voice signal contains multiple sentences, before processing the composite feature vector of each word in the voice signal through a deep learning model to obtain a named entity recognition result, the method further includes a step of truncating all obtained composite feature vectors of the voice signal.

Figure 6:
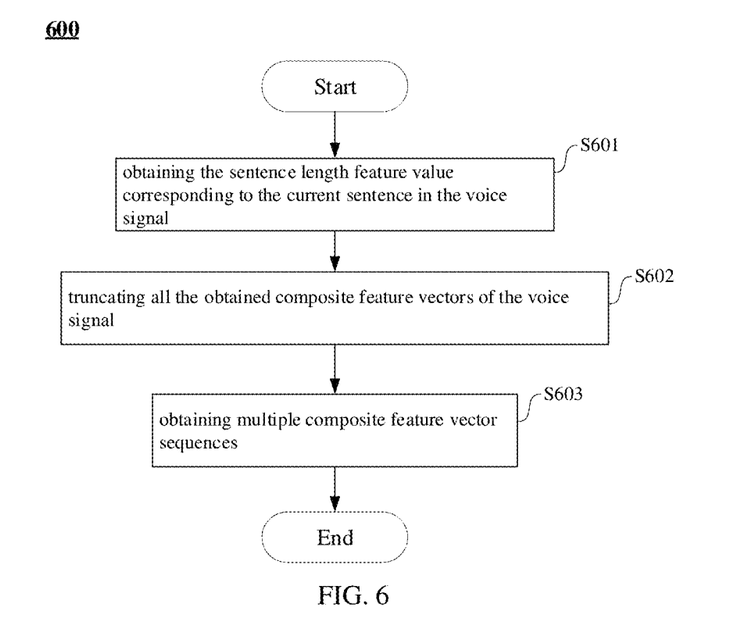
FIG. 6 illustrates a schematic diagram of truncating all composite feature vectors of the voice signal to obtain multiple composite feature vector sequences according to embodiments of the present disclosure.

FIG. 6 shows a schematic diagram of truncating all composite feature vectors of the voice signal to obtain multiple composite feature vector sequences according to embodiments of the present disclosure. Referring to FIG. 6, according to the truncating method 600 of the composite vector of the voice signal, first, the sentence length feature value corresponding to the current sentence in the voice signal needs to be obtained from a voice feature vector in the voice signal through step S601, wherein the sentence length feature value characterizes the sentence length of the current sentence in the voice signal. In some embodiments, it may be obtained according to data of the voice feature vector extracted from the voice signal, for example, through the sentence length feature in the aforementioned voice sentence feature vector, or sentence can be segmented based on a pause length between each word and the previous word in the voice word feature vector. In some embodiments, it may also be statistically obtained from the sentence segmentation feature in the literalness result after voice recognition is performed according to the voice signal.

Based on the obtained sentence length feature value corresponding to the current sentence in the voice signal, all the obtained composite feature vectors of the voice signal are truncated through step S602, that is, the composite feature vector of the voice signal is truncated in order based on the sentence length feature value of the current sentence of the voice signal, and multiple composite vector sequences obtained by truncation characterize multiple sentences in the voice signal respectively.

Based on the truncation manner described above, multiple composite feature vector sequences are obtained in S603, the number of the composite feature vector sequences is equal to the number of sentences contained in the voice signal, and the number of the composite feature vectors possessed by each of the multiple composite feature vector sequences is equal to the sentence length feature value corresponding to the current sentence in the voice signal.

In some implementations, further, in order to facilitate recognition of the neural network model or based on the needs of subsequent processing, as for multiple sequences obtained after truncation, the sentence length can be further set according to the maximum value of sentence length feature value of the current sentence in the voice signal, each sequence is expanded based on the preset sentence length, a preset value is added to insufficient vector data, for example, it is set to 0, so that the length of each sequence is equal to the preset sentence length, wherein the preset sentence length is greater than or equal to the maximum value of the sentence length feature value of the current sentence.

Figure 7:
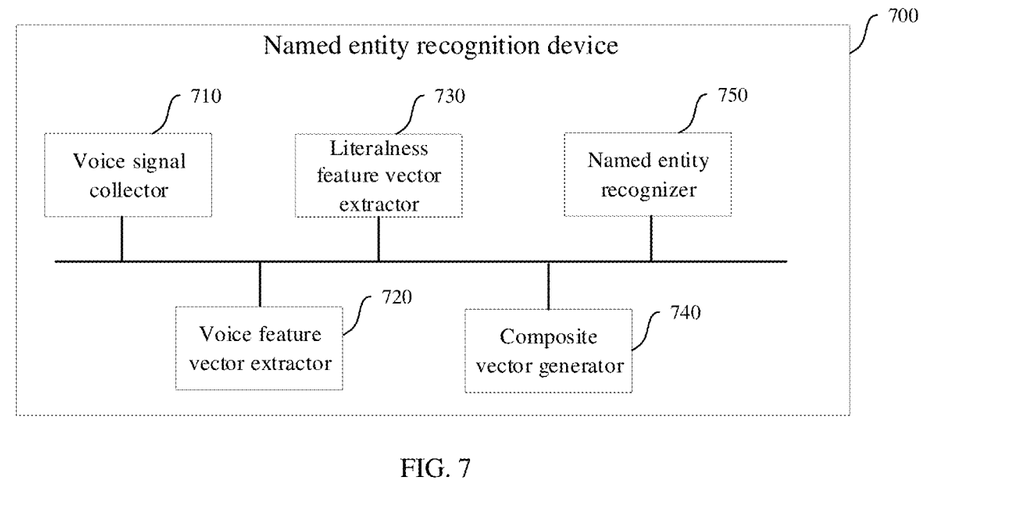
FIG. 7 illustrates a schematic block diagram of a named entity recognition device according to embodiments of the present disclosure.

FIG. 7 shows a schematic block diagram of a named entity recognition device according to embodiments of the present disclosure.

As shown in FIG. 7, the named entity recognition device 700 may include a voice signal collector 710, a voice feature vector extractor 720, a literalness feature vector extractor 730, a composite vector generator 740 and a named entity recognizer 750.

The voice signal collector 710 is configured to acquire a voice signal. The voice signal collector 710 may be, for example, a microphone component, which may include a microphone, a microphone sleeve, a mounting rod, a connection line, and the like; it may also be a wireless microphone or a microphone circuit.

The voice feature vector extractor 720 is configured to extract a voice feature vector in a voice signal. Specifically, for example, it can perform the process shown in FIG. 3C to implement the feature extraction shown in FIG. 3A and FIG. 3B.

The literalness feature vector extractor 730 is configured to extract, based on a literalness result after voice recognition is performed on the voice signal, a literalness feature vector in the literalness result. Specifically, for example, it may execute the process shown in FIG. 4 to implement literalness feature vector extraction.

The composite vector generator 740 is configured to splice the voice feature vector and the literalness feature vector to obtain a composite feature vector of each word in the voice signal. Specifically, for example, it can execute the process shown in FIG. 5 to achieve splicing of the voice feature vector and the literalness feature vector.

The named entity recognizer 750 is configured to process the composite feature vector of each word in the voice signal through a deep learning model to obtain a named entity recognition result. Specifically, for example, it can execute the process shown in FIG. 6 to obtain the corresponding entity recognition result through the processing result of the deep learning model.

The voice feature vector extractor 720, the literalness feature vector extractor 730, the composite vector generator 740 and the named entity recognizer 750 may be implemented, for example, as one or more dedicated or general purpose computer system modules or components, such as personal computers, laptops, tablets, mobile phones, personal digital assistance (PDA), smart glasses, smart watches, smart rings, smart helmets and any smart portable devices. It may be implemented, for example, by at least one processor and a memory, wherein the at least one processor is configured to execute program instructions, the memory may exist in different forms of program storage unit and data storage unit, such as a hard disk, a read-only memory (ROM), and a random access memory (RAM), it can be used to store various data files used by the processor in processing and/or performing named entity recognition, as well as possible program instructions executed by the processor.

Although the voice signal collector 710, the voice feature vector extractor 720, the literalness feature vector extractor 730, the composite vector generator 740 and the named entity recognizer 750 are presented as separate modules in FIG. 7, a person skilled in the art can understand that the above device modules may be implemented as separate hardware devices, or may be also integrated into one or more hardware devices. The specific implementation of different hardware devices should not be taken as factors for limiting the scope of the present disclosure, as long as the principles of the present disclosure can be implemented.

According to another aspect of the present disclosure, there is also provided a computer-readable storage medium having stored thereon computer-readable instructions that, when executed by a computer, perform the method as described above.

Using the named entity recognition method, the named entity recognition device and the named entity recognition equipment provided by the present disclosure, by using voice signal analysis to assist in entity name recognition, the traditional method of performing named entity recognition only on literalness result is extended forward, accuracy of named entity recognition is improved and application range of named entity recognition is enlarged. In particular, the method disclosed in the present disclosure can well overcome the problem of difficult recognition of named entity when there are multiple complex special names in the acquired voice signal in special scenarios, robustness and accuracy of named entity recognition is further improved.

Program portions of the technology may be considered to be "product" or "article" that exists in the form of executable codes and/or related data, which are embodied or implemented by a computer-readable medium. A tangible, permanent storage medium may include an internal memory or a storage used by any computers, processors, or similar devices or associated modules. For example, various semiconductor memories, tape drivers, disk drivers, or any similar devices capable of providing storage functionality for software.

All software or parts of it may sometimes communicate over a network, such as the internet or other communication networks. Such communication can load software from one computer device or processor to another. For example, loading from one server or host computer to a hardware environment of one computer environment, or other computer environment implementing the system, or a system having a similar function associated with providing information needed for image retrieval. Therefore, another medium capable of transmitting software elements can also be used as a physical connection between local devices, such as light waves, electric waves, electromagnetic waves, etc., to be propagated through cables, optical cables, or air. Physical medium used for carrying the waves such as cables, wireless connections, or fiber optic cables can also be considered as medium for carrying the software. In usage herein, unless a tangible "storage" medium is defined, other terms referring to a computer or machine "readable medium" mean a medium that participates in execution of any instruction by the processor.

Certain terminology has been used to describe embodiments of the present disclosure. For example, the terms "first/second embodiment", "one embodiment", "an embodiment", and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by a person skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "data block", "module", "engine", "unit," "module," or "system". Furthermore, aspects of the present disclosure may take the form of a computer program product embodied in one or more computer-readable media having computer-readable program code embodied thereon.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having the meaning that is consistent with their meaning in the context of the relevant art and will not be interpreted in an idealized or overly formal sense unless expressly so defined herein.

The above is illustration of the present disclosure and should not be construed as making limitation thereto. Although some exemplary embodiments of the present disclosure have been described, a person skilled in the art can easily understand that many modifications may be made to these exemplary embodiments without departing from the creative teaching and advantages of the present disclosure. Therefore, all such modifications are intended to be included within the scope of the present disclosure as defined by the appended claims. As will be appreciated, the above is to explain the present disclosure, it should not be constructed as limited to the specific embodiments disclosed, and modifications to the present disclosure and other embodiments are included in the scope of the attached claims. The present disclosure is defined by the claims and their equivalents.

What is claimed is:

1. A named entity recognition method, comprising:
acquiring a voice signal, the voice signal contains multiple sentences;
extracting a voice feature vector in the voice signal;
extracting, based on a literalness result after voice recognition is performed on the voice signal, a literalness feature vector in the literalness result;
splicing the voice feature vector and the literalness feature vector to obtain a composite feature vector of each word in the voice signal;
truncating, according to a sentence length feature value corresponding to a sentence of the multiple sentences, all obtained composite feature vectors of the voice signal to obtain multiple composite feature vector sequences, wherein the number of the composite feature vector sequences is equal to the number of sentences contained in the voice signal, and the number of the composite feature vectors possessed by each of the multiple composite feature vector sequences is equal to the sentence length feature value corresponding to the sentence in the voice signal;

processing the composite feature vector of each word in the voice signal through a deep learning model to obtain a named entity recognition result.

2. The named entity recognition method according to claim 1, wherein extracting the voice feature vector in the voice signal comprises: extracting a voice sentence feature vector and extracting a voice word feature vector.

3. The named entity recognition method according to claim 2, wherein extracting the voice sentence feature vector in the voice signal comprises:

converting, according to a voice parameter comparison table in a preset voice sentence database, a voice sentence feature in the voice signal into a corresponding voice sentence feature vector.

4. The named entity recognition method according to claim 2, wherein extracting a voice word feature vector in the voice signal comprises:

obtaining a voice word feature vector in the voice signal by performing voice analysis on the voice signal.

5. The named entity recognition method according to claim 4, wherein performing voice analysis on the voice signal comprises:

performing discrete sampling on the voice signal in a time domain and a frequency domain to obtain a digital voice signal;

processing each word in the digital voice signal in the time domain and the frequency domain respectively to obtain a time domain feature vector and a frequency domain feature vector thereof;

splicing, for each word in the voice signal, the time domain feature vector and the frequency domain feature vector thereof to obtain a voice word feature vector corresponding to each word.

6. The named entity recognition method according to claim 1, wherein extracting, based on the literalness result after the voice recognition is performed on the voice signal, the literalness feature vector in the literalness result comprises: extracting a word feature vector and extracting a word segmentation embedding feature vector.

7. The named entity recognition method according to claim 6, wherein extracting the word feature vector in the literalness result comprises:

converting, according to a literalness-vector value comparison table in a preset word database, the literalness into a corresponding word feature vector.

8. The named entity recognition method according to claim 6, wherein extracting the word segmentation embedding feature vector in the literalness result comprises:

dividing, according to a phrase comparison table in a preset phrase database, a phrase and an individual word in the literalness result;

converting, according to a preset transform rule, each word in the phrase and the individual word into a corresponding word segmentation embedding feature vector respectively.

9. The named entity recognition method according to claim 1, wherein splicing the voice feature vector and the literalness feature vector to obtain the composite feature vector of each word in the voice signal comprises:

performing normalization processing on the extracted voice feature vector and the extracted literalness feature vector respectively;

subjecting a dense literalness feature vector and a dense voice feature vector obtained for each word in the voice signal after the normalization processing to vector-splicing so as to obtain the composite feature vector for each word in the voice signal.

10. The named entity recognition method according to claim 1, wherein splicing the voice feature vector and the literalness feature vector to obtain the composite feature vector of each word in the voice signal comprises:

vector-splicing a dense literalness feature vector and a dense voice feature vector obtained for each word in the voice signal to obtain the composite feature vector for each word in the voice signal;

performing normalization processing on the voice feature vector and the literalness feature vector in the obtained composite feature vector respectively.

11. The named entity recognition method according to claim 9, wherein performing normalization processing comprises:

performing linear function normalization processing on the voice feature vector and the literalness feature vector respectively.

12. The named entity recognition method according to claim 9, wherein performing normalization processing comprises:

performing zero-mean standardization processing on the voice feature vector and the literalness feature vector respectively.

13. The named entity recognition method according to claim 1, wherein processing the composite feature vector of each word in the voice signal through the deep learning model to obtain the named entity recognition result comprises:

sending the composite feature vector to an input terminal of a selected deep learning model;

processing the composite feature vector through respective layers in the selected deep learning model;

obtaining a named entity recognition result at an output terminal of the deep learning model.

14. The named entity recognition method according to claim 1, wherein the sentence length feature value of the current sentence in the voice signal is obtained from a voice feature vector in the voice signal.

15. The named entity recognition method according to claim 1, wherein the sentence length feature value of the current sentence in the voice signal is obtained from the literalness result after voice recognition is performed on the voice signal.

16. A named entity recognition equipment, wherein the equipment comprises a voice acquisition device, a processor and a memory, the memory contains a set of instructions that, when executed by the processor, cause the named entity recognition equipment to execute the following operations:

acquiring a voice signal, the voice signal contains multiple sentences;

extracting a voice feature vector in the voice signal;

extracting, based on a literalness result after voice recognition is performed on the voice signal, a literalness feature vector in the literalness result;

splicing the voice feature vector and the literalness feature vector to obtain a composite feature vector of each word in the voice signal;

truncating, according to a sentence length feature value corresponding to a sentence of the multiple sentences, all obtained composite feature vectors of the voice signal to obtain multiple composite feature vector sequences, wherein the number of the composite feature vector sequences is equal to the number of sentences contained in the voice signal, and the number of the composite feature vectors possessed by each of the multiple composite feature vector sequences is equal to the sentence length feature value corresponding to the sentence in the voice signal;

processing the composite feature vector of each word in the voice signal through a deep learning model to obtain a named entity recognition result.

17. A non-transitory computer-readable storage medium, characterized in having computer-readable instructions stored thereon, and when the instructions are executed by a computer, executing the following operations:

acquiring a voice signal, the voice signal contains multiple sentences;

extracting a voice feature vector in the voice signal;

extracting, based on a literalness result after voice recognition is performed on the voice signal, a literalness feature vector in the literalness result;

splicing the voice feature vector and the literalness feature vector to obtain a composite feature vector of each word in the voice signal;

truncating, according to a sentence length feature value corresponding to a sentence of the multiple sentences, all obtained composite feature vectors of the voice signal to obtain multiple composite feature vector sequences, wherein the number of the composite feature vector sequences is equal to the number of sentences contained in the voice signal, and the number of the composite feature vectors possessed by each of the multiple composite feature vector sequences is equal to the sentence length feature value corresponding to the sentence in the voice signal;

processing the composite feature vector of each word in the voice signal through a deep learning model to obtain a named entity recognition result.

* * * * *